(12) United States Patent
Koenck

(10) Patent No.: US 10,219,509 B2
(45) Date of Patent: Mar. 5, 2019

(54) 3-IN-1 FOLDABLE AVIAN DECOY

(71) Applicant: Aaron Emil Koenck, Leesville, LA (US)

(72) Inventor: Aaron Emil Koenck, Leesville, LA (US)

( * ) Notice: Subject to any disclaimer, the term of this patent is extended or adjusted under 35 U.S.C. 154(b) by 348 days.

(21) Appl. No.: 15/042,201

(22) Filed: Feb. 12, 2016

(65) Prior Publication Data

US 2016/0235053 A1 Aug. 18, 2016

Related U.S. Application Data

(60) Provisional application No. 62/115,702, filed on Feb. 13, 2015.

(51) Int. Cl.
*A01M 31/06* (2006.01)
(52) U.S. Cl.
CPC .................................. *A01M 31/06* (2013.01)
(58) Field of Classification Search
CPC ...................................................... A01M 31/06
See application file for complete search history.

(56) References Cited

U.S. PATENT DOCUMENTS

| | | | |
|---|---|---|---|
| 230,600 A | 8/1880 | Allen | |
| 512,810 A | 1/1894 | Curlin | |
| 2,435,083 A * | 1/1948 | Johnson | A01M 31/06 43/3 |
| 2,489,271 A * | 11/1949 | Colgan | A01M 31/06 114/355 |
| 2,590,842 A * | 4/1952 | Colgan | A01M 31/06 428/16 |
| 2,662,327 A | 12/1953 | Petersen | |
| 4,928,418 A * | 5/1990 | Stelly | A01M 31/06 43/3 |
| D365,136 S | 12/1995 | Shaver | |
| 6,216,382 B1 * | 4/2001 | Lindaman | A01M 31/06 248/156 |
| 6,874,270 B2 * | 4/2005 | Lorenz | A01M 31/06 43/2 |
| 7,337,575 B2 * | 3/2008 | Hulley | A01M 31/06 43/3 |
| 7,568,305 B2 | 8/2009 | Fanfelle | |
| 8,136,288 B1 | 3/2012 | Shope | |
| 2002/0073598 A1 * | 6/2002 | Wright | A01M 31/06 43/3 |

(Continued)

OTHER PUBLICATIONS

U.S. Appl. No. 11/136,301, filed Dec. 8, 2005, Foster.

*Primary Examiner* — Christopher R Harmon

(57) ABSTRACT

The 3-in-1 Foldable Avian Decoy eliminates the need for multiple types of single purpose avian decoys. The decoy can be used in environments that include, but are not limited to land, ice, and water, hunting blind covers. The foldable design allows for ease of use when moving and storing the stated invention. The presented invention is a foldable avian decoy that capable of full-body decoy from, a half-body form, or floating decoy form. The 3-in-1 Foldable Avian Decoy consist of a flexible body and stand or conversion piece at any one time. The decoy is fully expanded and the stand is added for use as a full-body decoy. The decoy anterior is concaved and the conversion piece is inserted to form a half-body decoy or a floating decoy in the preferred method of floating decoy form.

3 Claims, 3 Drawing Sheets

(56) References Cited

U.S. PATENT DOCUMENTS

| | | | |
|---|---|---|---|
| 2012/0198753 A1* | 8/2012 | Idstrom | A01M 31/06 43/3 |
| 2014/0237885 A1* | 8/2014 | Brooks | A01M 31/06 43/2 |
| 2015/0173347 A1* | 6/2015 | Lawton, Jr. | A01M 31/06 43/3 |

* cited by examiner

3-IN-1 FOLDABLE AVIAN DECOY

This application claims the benefit of PPA Ser. No. 62/115,702, filed Feb. 13, 2015 by the present inventor.

BACKGROUND OF THE INVENTION

1. Field of the Invention

The present invention relates, in general, to avian decoys, and primarily to foldable duck and geese decoys, etc., adapted to form a full body, half body, and floating decoy.

2. Background Art

It is often desired to have a decoy spread (a plurality of decoys arranged on a field or the like) with one or more of the decoys representing real birds. Single form decoys that represent an avian standing, sitting, or floating achieve this traditionally. These decoys are incapable of transforming to another form without significant modification (cutting, adhesives) or do not represent the anatomy of a real bid accurately. These designs have failed to combine a foldable or collapsible decoy, and a multiple environment decoy, which lead to many benefits that previous designs are incapable of achieving.

Benefits previous art of multi-environment decoys exclude are space reduction of the decoy which more needed space to transport decoys to the hunting environment and store when not in use. Previous art related to collapsible full-body decoy fail to form a multi-environment decoy. Prior art also attempts to do the opposite of the invention demonstrated here by converting a single form, floating decoy to a field decoy. This causes a lack of anatomical realism of the decoy that is desired. Prior art that have achieved a full-body that can float without shifting the body material lack the ability to fold or become a half-body decoy. Nothing in the known prior art discloses or suggests the present invention.

Objects and Advantages

It is an object of the present invention to provide an easy-to-use, avian decoy, e.g., a duck, goose decoy or turkey decoy that can quickly manifest as full body, half body, or floating decoy that can fold in to a noticeably smaller form. Since the default form of the decoy is a full-body decoy, the decoy can represent a full body, half-body and floating decoy. The present invention eliminates and makes obsolete single form decoys that have been discussed in prior art since it can perform the function of full-body, half-body, and floating forms. The ability to fold also removes the large space needed for previous art caused by rigidity of the body forms of the previous art.

BRIEF SUMMARY OF THE INVENTION

A 3-in-1 Foldable Avian Decoy can be used in multiple environments. The present invention provides an avian decoy that can embody several forms of decoy types. These types include full-bodied, half-bodied, and a floating decoy. The invention is also capable of being folded or compressed to reduce the overall size of the invention when not in use.

DETAILED DESCRIPTION AND PREFERRED MODE OF IMPLEMENTATION

Figure 1:
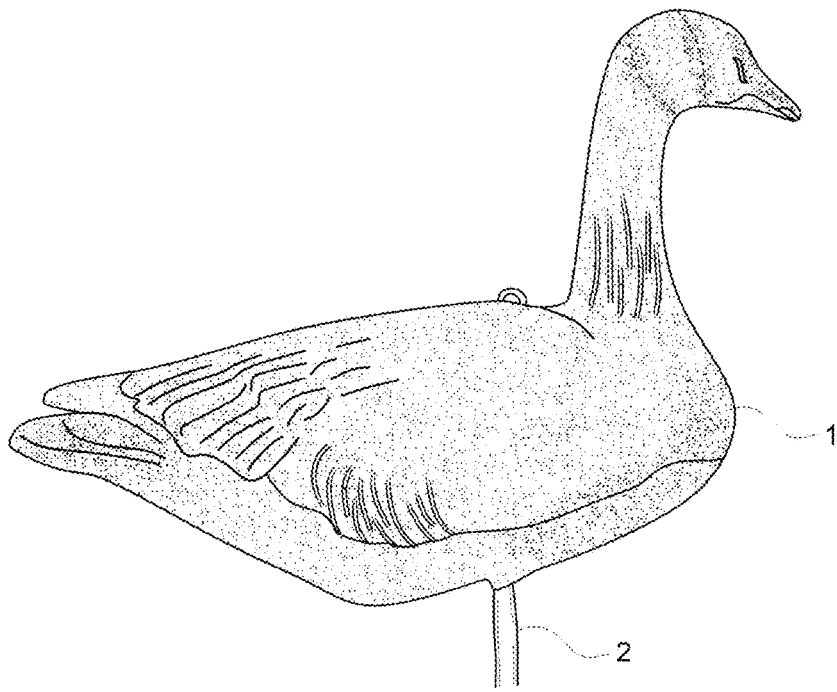
FIG. 1. illustrates the 3-in-1 Foldable Avian Decoy fully expanded as full-body decoy from a side elevational view. The flexible body and full-body stand are shown.
Figure 2:
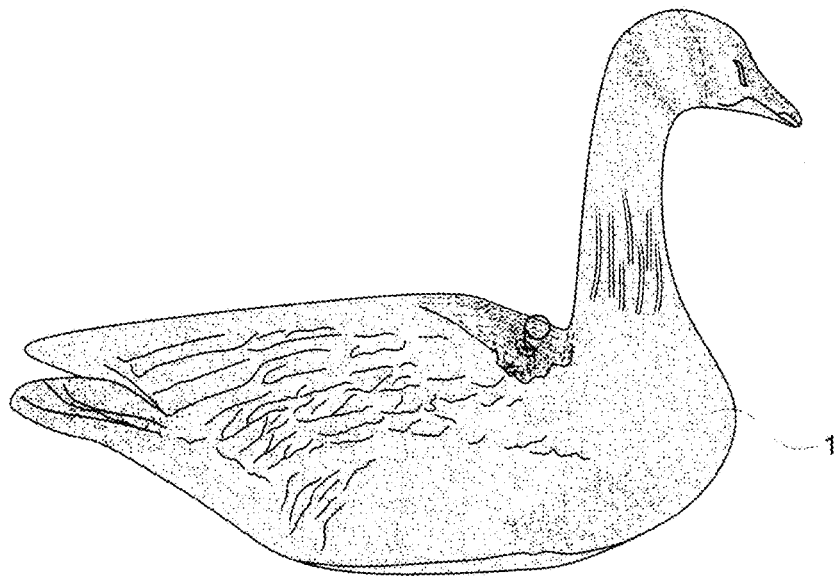
FIG. 2. illustrates a 3-in-1 Foldable Decoy used as a half-body from a side elevational view.
Figure 3:
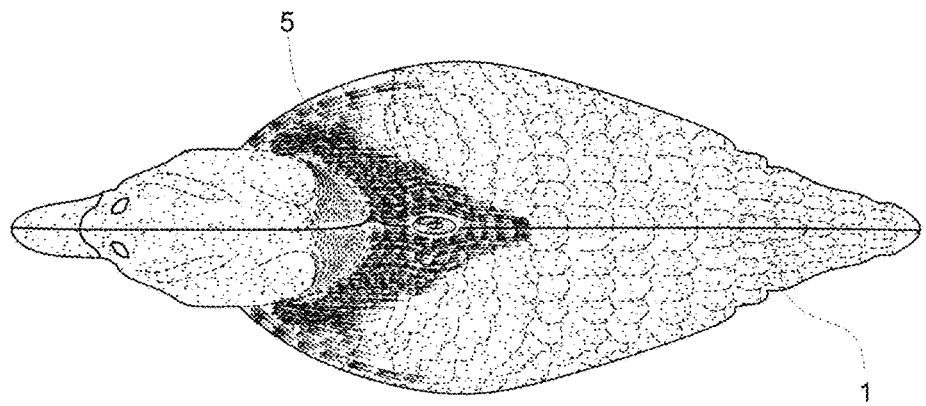
FIG. 3. illustrates an overhead view of the decoy in any of its forms.
Figure 4:
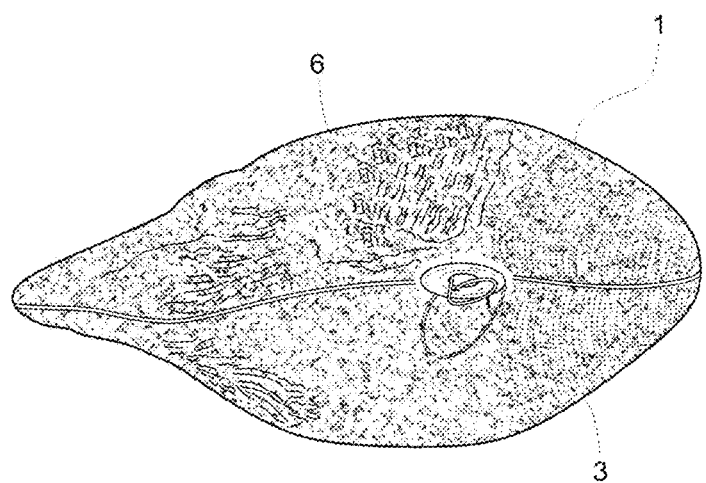
FIG. 4. illustrates the anterior view of the decoy in its half-body form and a floating form. Additionally, the concave form of the half-body and a floater is illustrated.
Figure 6:
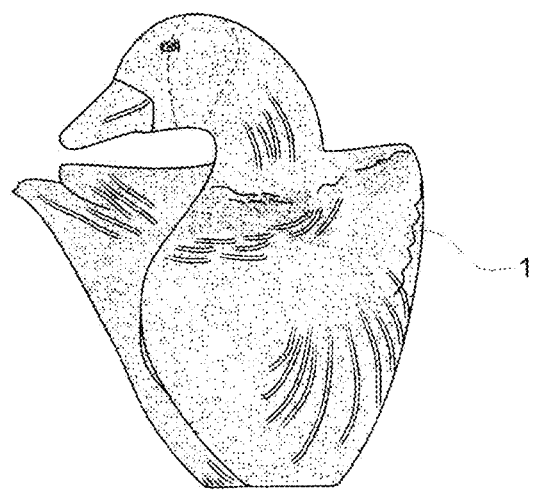
FIG. 6. illustrates a flexible decoy body compressed and folded along a vertical axis of the said body.

A 3-in-1 Foldable Avian Decoy is a foldable decoy that can be used as a full-body decoy FIG. 1, half-body decoy FIG. 2, and floating decoy FIG. 2. The decoy can be folded FIG. 6 reducing its size for ease of handling in and out of the environment of use.

For use as the full-body decoy FIG. 1, the user fully expands the decoy body 1 and insets the stand 2 in to the anterior (breast) hole 6 of the decoy body 1 to a corresponding dorsal (back ridge) containment point. The decoy can be easily expanded and collapsed FIG. 6 with a flexible body 1 material.

For use as the half-body decoy FIG. 2 or a floating decoy form, the anterior of the decoy is made a concave shape by applying enough force to the anterior of the flexible decoy body 1 to form the concave anterior. Next, the vertical shaft 4 and horizontal shaft 5 of the conversion piece are inserted to the anterior hole 6 of the invention's flexible body 1. Then the top of the conversion piece 5 is inserted in to the dorsal piece containment point of the decoy. Resting a horizontal extension 5 on the dorsum of the decoy body 1 is the preferred. This keeps the decoy's anterior concave by creating a lock between the anterior and dorsum of the decoy body 1. The concave nature of the decoy anterior causes the decoy to float on the water with a natural look and stability not found in two-form hard body decoy: floating form and field form decoy. This is not the only means to form a floating decoy but is the preferred method. The concave shape allows the bottom plane of the decoy to be level; therefore, an ability to rest on ice, land, and attachment to hunting blind covers.

Figure 5:
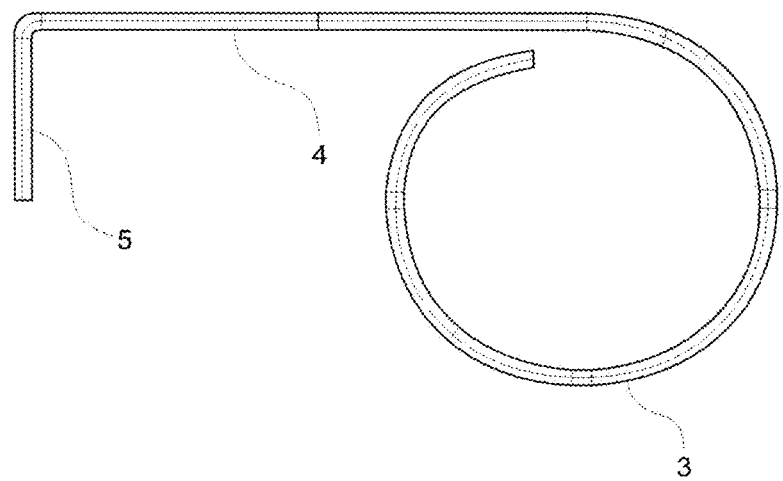
FIG. 5. illustrates a conversion piece. A circular end, vertical shaft, and horizontal extension shaft are illustrated.

The conversion piece FIG. 5 functions as a means to help keep fluid out of the decoy body interior and the design shown FIG. 2,3 allows the decoy to rest nearly level on a surface. The design has a loop 3 on one end that is used for an anchor tie off. The loop 3 of the conversion piece has a diameter greater than the diameter of the decoy body's 1 anterior hole 6. The larger diameter of the loop 3 keeps the decoy anterior in a concave shape and therefore a level lower plane to sit approximately level on the water or land. Other deigns can serve the same function as this, but are within the scope of the invention. These include any piece designed to keep fluid out of the flexible decoy body anterior hole 6 or allow the decoy body 1 to have buoyancy in a fluid.

The main body shaft 4 of the conversion piece FIG. 5 is vertical, and connects the dorsal of the decoy body 1 and the anterior at a predetermined length depending on the size of the decoy body 1. The length of the shaft 4 is at minimum enough to keep the anterior hole above the lowest point of the decoy body when in its half body form FIG. 2.

The top of the shaft 4 in this design contains another short shaft 5 that is perpendicular to the main body shaft 4. In conjunction with the anterior loop 3, the perpendicular extension 5 holds the conversion piece FIG. 5 in place when resting on the dorsum of the decoy body 1; therefore, securing the anterior of the decoy body 1 in a concave shape.

A 3-in-1 Foldable Avian Decoy is composed of a flexible body 1, and stand 2 or conversion piece FIG. 5. The preferred soft material for the body 1 is closed cell foam or Ethylene vinyl acetate (EVA) plastic but other flexible materials can also be used. The preferred material for the long stake 2 is fiberglass or plastic. The preferred material for the conversion piece FIG. 5 is metal wire but other designs can serve same function could me made from plastics. Metal is chosen for durability and simplicity.

A foldable decoy that can serve as a full body decoy FIG. 1 and a floating decoy is still within the scope of the invention since less effective designs can replicate these two body positions without replicating the half body form FIG. 2.

Although the present invention has been described and illustrated with respect to preferred embodiments and a preferred use therefor, it is not to be so limited since modifications and changes can be made therein which are within the full intended scope of the invention. These changes include, but are not limited to, embodiment materials and method for converting a foldable full-body avian decoy to a floating decoy or a half body-decoy.

The invention claimed is:

1. An avian decoy comprising a flexible body capable of expansion and folding into a plurality of configurations including a dorsal portion and an anterior portion with an aperture; a conversion piece comprising a loop, horizontal shaft and a vertical shaft; said dorsal portion comprises a containment point for accepting the end of a stand in a full body configuration and accepting said horizontal shaft in a half body configuration, locking said anterior and dorsal portions into relative positions with respect to one another; wherein said portion is configurable into a concave anterior shape allowing the decoy to float.

2. The avian decoy of claim 1, wherein said conversion piece acts to keep fluid out of the decoy body interior or provide buoyancy thereto.

3. The avian decoy of claim 1, wherein said loop is a point to provide ballast or an anchor tie off.

* * * * *